United States Patent [19]
Gaul

[11] Patent Number: 5,703,715
[45] Date of Patent: Dec. 30, 1997

[54] DEVICE FOR STABILIZING THE FOCUS OF A MICROSCOPE

[75] Inventor: Norbert Gaul, Solms-Oberbiel, Germany

[73] Assignee: Leica Mikroskopie und Systeme GmbH, Wetzlar, Germany

[21] Appl. No.: 689,968

[22] Filed: Aug. 16, 1996

[30] Foreign Application Priority Data

Aug. 16, 1995 [DE] Germany .................. 195 30 136.6

[51] Int. Cl.⁶ .................. G02B 21/26; G02B 21/00
[52] U.S. Cl. .................. 359/392; 359/382
[58] Field of Search .................. 359/382, 383, 359/391, 392

[56] References Cited

U.S. PATENT DOCUMENTS

| | | | |
|---|---|---|---|
| 4,703,181 | 10/1987 | Swann et al. | 250/442.1 |
| 4,733,954 | 3/1988 | Reinheimer et al. | 350/523 |
| 5,438,451 | 8/1995 | Schweizer | 359/391 |

FOREIGN PATENT DOCUMENTS

| | | | |
|---|---|---|---|
| 3523756 | 12/1986 | Germany | 359/392 |
| 35 20 475 | 10/1989 | Germany . | |
| 42 32 079 | 3/1994 | Germany . | |
| 0022574 | 8/1915 | United Kingdom | 359/382 |

*Primary Examiner*—Paul M. Dzierzynski
*Assistant Examiner*—Mark Robinson
*Attorney, Agent, or Firm*—Foley & Lardner

[57] ABSTRACT

A device for stabilizing the focus in a microscope (1) is described which has an objective (2) and a specimen stage (3), constructed in a movable fashion, for the purpose of setting the focus. The specimen stage (3) is constructed such that it can be moved via a toothed rack (4) and a drive gear (5) along the optical axis (22) of the objective (2). When the microscope (1) is heated by integrated electronic components (6) and/or an illuminating device (7), the body (13) of the microscope expands, and the microscope (1) is thereby defocused. Two rods (8 and 9) connected to one another, which have a different thermal expansion, are arranged between the toothed rack (4) and the specimen stage (3) for the purpose of compensating for the defocusing.

20 Claims, 1 Drawing Sheet

DEVICE FOR STABILIZING THE FOCUS OF A MICROSCOPE

BACKGROUND OF THE INVENTION

1. Field of the Invention

The present invention generally relates to microscopes and, more particularly, is concerned with a device for stabilizing the focusing operation of a microscope.

2. Description of the Related Art

Known microscopes are generally equipped with an objective turret which accommodates a plurality of different objectives. The desired objective is swivelled into the beam path of the microscope by rotating the turret. The focusing of the objective is performed by moving the specimen stage along the optical axis of the microscope objective. A toothed rack which meshes with a drive gear is firmly arranged on the specimen stage for this purpose. This drive gear is connected via further gearing devices to the operating control knobs provided external to the body of the microscope. In addition, or as an option, the drive gear can also be connected to a motor drive.

Furthermore, in known microscopes, electronic components are integrated for the purpose of controlling diverse automatic or motorized microscope functions, or supplying the light source with current/voltage.

The light source and the integrated electronic components cause the body of the microscope to be heated during operation.

It has been proven in practice that the body of the microscope expands when heated. This expansion and the extremely small depth of field of the microscope objectives (which may be, for example, in the μ range) produce the undesired effect that there is a change in the spacing between the specimen stage, with the specimen, and the microscope objective, with the result that, once set, the focal position may be lost.

A microscope having integrated electric and electronic components is disclosed in DE 35 20 475. The heating of the body of the microscope is avoided with this microscope by providing thermally insulated chambers in the microscope stand base for the purpose of accommodating all the electric and electronic components and by dissipating the heat generated via ventilation slots present in the base plate.

DE 25 58 625 A1 discloses a drilling or milling machine which has a thermal compensation device and a sensor. For the purpose of compensating the heat caused by radiation, the spindle bearing arranged on the arm of the machine is assigned an iron rod and an aluminum rod which is arranged parallel thereto and operates in a way opposite to the iron rod with respect to thermal expansion. The iron rod bears at one end an electrically operated sensor which is, in addition, connected to the arm.

Thermally caused thermal expansions of the arm, and the maladjustment, associated therewith, of the tool in the X-Y direction are detected via the sensor, such an arrangement presupposing a fixed spacing between the mounting points of the rods on the machine housing and the mounting of the sensor on the spindle.

The measured values generated by the sensor are entered for compensation purposes into an electronically controlled drive of the table by means of the work clamping. The aim here, expediently, is thereby to vary the zero setting of the table as a function of the thermal expansion of the housing.

DE 42 32 079 A1 describes a piezoelectric translator for the specimen stage of a confocal microscope, which moves the specimen stage centrally and without play. The piezoelectric translator largely excludes radial migration of the stage as a consequence of thermal drift.

SUMMARY OF THE INVENTION

It is therefore the object of the present invention to compensate for defocusing in the Z-direction which is caused by thermal expansion of the body of the microscope without additional, electronically controlled actuators.

It is another object of the invention to preserve the general design of a known microscope.

It is yet another object of the invention to provide, a device which behaves dynamically, that is to say with increasing temperature in the microscope or microscope stand and an associated corresponding amount of defocusing, the corresponding amount of defocusing is compensated for and the set focus is maintained over a large temperature range.

According to the present invention, a device for stabilizing the focus of a microscope includes first and second rods, with different coefficient of thermal expansion values, interposed between a toothed rack and a specimen stage of the microscope, the second rod being connected with one of its ends to the toothed rack and with its other end to the first rod, wherein the first rod bears the specimen stage. The two rods are produced in this case from materials having different thermal expansion coefficients. The two rods can also be of different length dimensions for the purpose of exact matching to the thermal conditions in the microscope stand.

The invention will be explained in more detail with reference to an exemplary embodiment with the aid of the following drawing.

DESCRIPTION OF THE PREFERRED EMBODIMENTS

Figure 1:
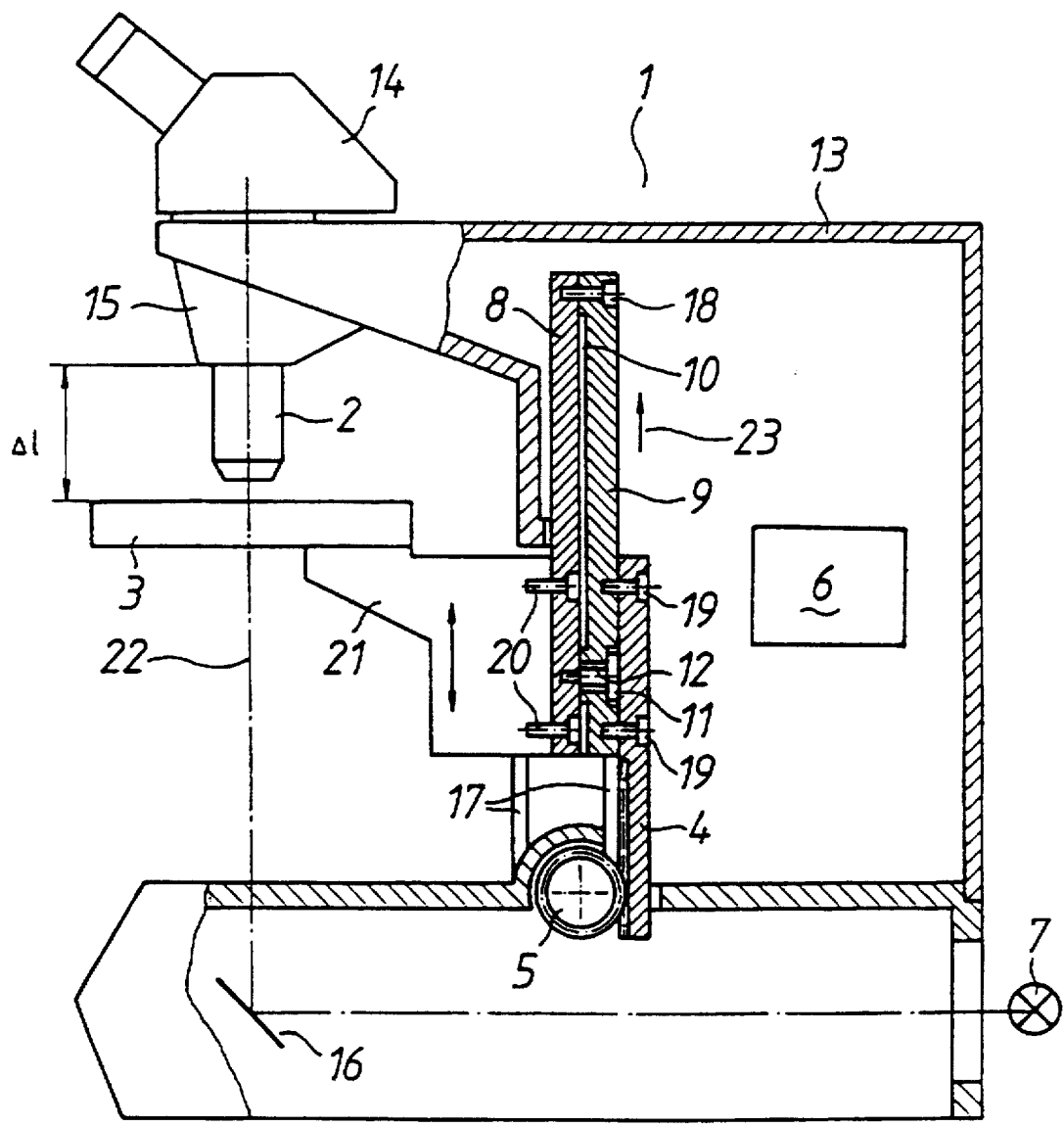
FIG. 1 shows a device for stabilizing the focus of a microscope according to the invention.

FIG. 1 shows a microscope 1, a microscope objective 2, a specimen stage 3, a toothed rack 4, a drive gear 5, integrated electronic components 6, an illuminating device 7, a first rod 8, a second rod 9, air gap 10, a screw 11, an elongated hole 12, a body of microscope 13, a binocular tube 14, an objective revolver 15 (also referred to as the objective turret 15), a deflecting mirror 16, a guide 17, a screw 18, screws 19, screws 20, a stage angle 21, an objective axis 22, and a direction arrow 23.

Microscope 1 includes the body 13, the binocular tube 14, and the objective turret 15 with the microscope objective 2 located in the working position. Arranged below the objective 2 on the objective axis 22 is a specimen stage 3 for receiving a preparation. The preparation is transilluminated by an illuminating system 7 which is indicated here as an external device. A deflecting mirror 16 is arranged for this purpose in the beam path or in the optical axis 22.

The body 13 of the microscope further has an integrated chamber 6 for accommodating electronic control circuits and/or for accommodating a current/voltage supply for the illuminating device 7.

The specimen stage 3 is firmly connected to a stage angle 21. For the purpose of focusing the microscope objective 2, the stage angle 21 is constructed to move along the guides 17, which are arranged firmly on the body 13 of the microscope, in the direction of the double arrow 24. The stage angle 21 is firmly connected to a first rod 8 via two screws 20. This first rod 8 is preferably produced from iron and connected via a screw 18 to a second rod 9, which is preferably made from aluminum. A toothed rack 4 is mounted on the second rod 9 via two screws 19. The toothed rack 4 engages with a drive gear 5 which is connected via further gearing means (not shown) to external control knobs and/or to a motor drive.

The two rods 8 and 9 are secured against a lateral rotation or displacement by a screw 11. Provided for this purpose in the second rod 9 is an elongated hole 12 in the longitudinal direction through which a screw 11 is guided. The screw 11 is mounted in the opposite first rod 8. An air gap 10 is provided between the two rods 8 and 9 in order to reduce friction.

A rotary movement of the drive gear 5 is transmitted via the toothed rack 4 and the two rods 8 and 9 to the, stage angle 21 with the specimen stage 3, with the result that the specimen stage 3 is moved along the objective axis 22 in the direction of the double arrow 24 for the purpose of focusing.

As the operating period of the microscope 1 increases, development of heat by the integrated electronic components 6 and the illuminating device 7 heats the body 13 of the microscope 1, and a corresponding expansion results. As a consequence of this expansion, the spacing ΔL between the microscope turret 15 and the specimen stage 3 is enlarged. Owing to the extremely small depth of field of the microscope objective 2 (in the μ range), the set focus is lost due to the change in the spacing ΔL.

The microscope stage 3 is connected to the two bars 8 and 9 in order to compensate for the change in spacing. The specimen stage 3 is tracked as a function of the temperature owing to the different thermal expansion coefficients of the rod materials employed, the first rod 8 being made from, for example, iron (with a thermal expansion coefficient of $12.1*10^{-6}$) and the second rod 9 from, for example, aluminum (with a thermal expansion coefficient of $23.8*10^{-6}$).

In the present embodiment, during heating, the first rod 8 expands in the direction 23 of the arrow, since the second rod 9 is fixed via the toothed rack 4 and the drive pinion 5. At the same time, there is an expansion of the second rod 9. Owing to the different expansion coefficients of the two rods 8, 9, the amount of expansion of the rod 9 is greater, given an identical length of construction, than that of the rod 8. The difference between the two amounts produces a raising of the specimen stage 3 in the direction of the microscope objective 2, thereby compensating for previously described enlargement in the spacing ΔL. The amounts can be varied by selecting different lengths of construction for the two rods 8, 9.

By appropriate selection of the lengths of construction of the individual rods 8 and 9, and/or by using other materials with corresponding thermal expansion coefficients, it is possible to achieve compensation for the defocusing which is particular and matched to each of the diverse body shapes and sizes of microscopes.

The focus stabilizing device of the present invention and many of its attendant advantages will be understood from the foregoing description and it will be apparent that various changes may be made in form, construction and arrangement of the parts thereof without departing from the spirit and scope of the invention or sacrificing all of its material advantages, the form hereinbefore described being merely a preferred or exemplary embodiment thereof.

What is claimed is:

1. A device for stabilizing the focus in a microscope, the microscope having an objective and a specimen stage which, for the purpose of setting the focus, is constructed such that it can be adjusted in height along an objective axis by a drive gear and a toothed rack, and having a body of the microscope in which generate heat and cause a displacement, caused by heat, in distance of the specimen stage relative to the objective, and thus cause defocusing, said device comprising:

at least two rods of different thermal expansion for compensating for the defocusing caused by heat, said rods being interposed between the toothed rack and the specimen stage, the second rod being connected with one of its ends to the toothed rack and with its other end to one end of the first rod, and the first rod bearing the specimen stage with its other end, said first rod counteracting the thermal elongation of the second rod and thus the displacement of the specimen stage through the thermal elongation of the first rod due to heat, wherein the specimen stage is tracked in distance as a function of temperature as a consequence of the different thermal expansions of the two rods.

2. The device for stabilizing the focus in a microscope as claimed in claim 1, wherein the first rod and the second rod are arranged next to one another and aligned in a parallel manner with the toothed rack.

3. The device for stabilizing the focus in a microscope as claimed in claim 1, wherein the second rod has a coefficient of thermal expansion which is greater than that of the first rod.

4. The device for stabilizing the focus in a microscope as claimed in claim 1, wherein the two rods are spaced from one another in order to reduce the friction of the two rods on one another.

5. The device for stabilizing the focus in a microscope as claimed in claim 1, wherein the second rod is comprised of aluminum and the first rod is comprised of iron.

6. The device for stabilizing the focus in a microscope as claimed in claim 1, wherein for the purpose of lateral guidance of the two rods on one another, one of the two rods bears a screw on its end opposite to the end where the two rods are connected to each other, and the other of the two rods has an elongate hole in which the screw engages.

7. The device for stabilizing the focus in a microscope as claimed in claim 1, wherein the lengths of the two rods are dimensioned differently.

8. The device for stabilizing the focus in a microscope as claimed in claim 2, wherein the second rod has a coefficient of thermal expansion which is greater than that of the first rod.

9. The device for stabilizing the focus in a microscope as claimed in claim 8, wherein the two rods are spaced from one another in order to reduce the friction of the two rods on one another.

10. The device for stabilizing the focus in a microscope as claimed in claim 9, wherein the second rod is comprised of aluminum and the first rod is comprised of iron.

11. The device for stabilizing the focus in a microscope as claimed in claim 10, wherein for the purpose of lateral guidance of the two rods on one another, one of the two rods bears a screw on its end opposite to the end where the two rods are connected to each other, and the other of the two rods has an elongate hole in which the screw engages.

12. The device for stabilizing the focus in a microscope as claimed in claim 11, wherein the lengths of the two rods are dimensioned differently.

13. A device for stabilizing the focus of a microscope, comprising:

a first rod bearing a specimen stage of the microscope; and a second rod connected at one end to the first rod and at its other end to a toothed rack of the microscope, wherein the first and second rods have different coefficients of thermal expansion.

14. The device for stabilizing the focus in a microscope as claimed in claim 13, wherein the first rod and the second rod are aligned parallel with the toothed rack.

15. The device for stabilizing the focus in a microscope as claimed in claim 13, wherein the second rod has a coefficient of thermal expansion which is greater than that of the first rod.

16. The device for stabilizing the focus in a microscope as claimed in claim 13, wherein the first and second rods are spaced from one another in order to reduce the friction of the first and second rods on one another.

17. The device for stabilizing the focus in a microscope as claimed in claim 13, wherein the second rod is comprised of aluminum and the first rod is comprised of iron.

18. The device for stabilizing the focus in a microscope as claimed in claim 13, wherein one of the first and second rods bears a screw on one end, and the other of the first and second rods has an elongate hole in which the screw engages.

19. The device for stabilizing the focus in a microscope as claimed in claim 13, wherein the first and second rods have different lengths.

20. The device for stabilizing the focus in a microscope as claimed in claim 13, wherein defocusing of the microscope is compensated for by the expansion of the first and second rods.

* * * * *